(No Model.)
J. CUTHBERTSON.
ARBOR BEARING.
No. 422,298. Patented Feb. 25, 1890.
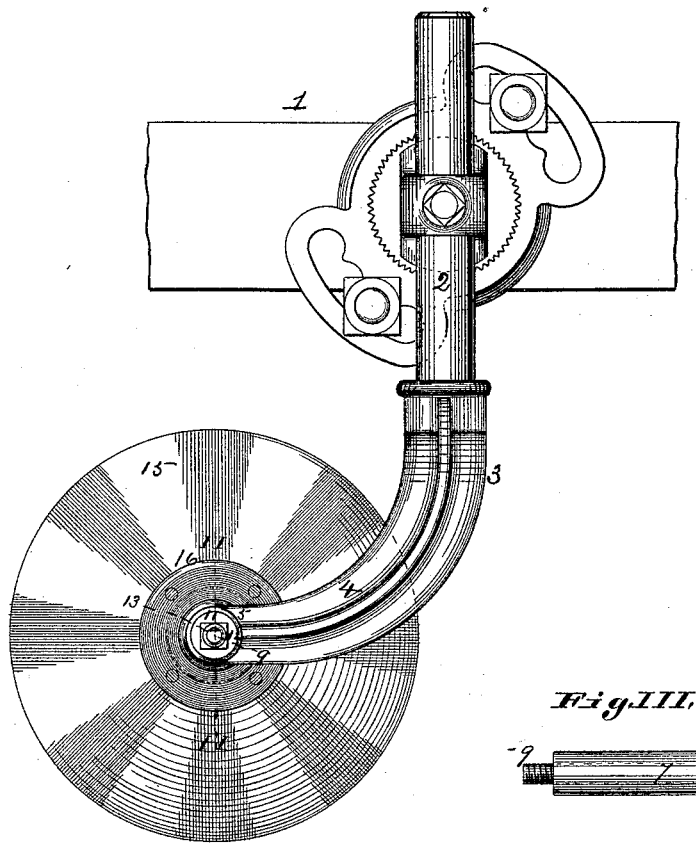
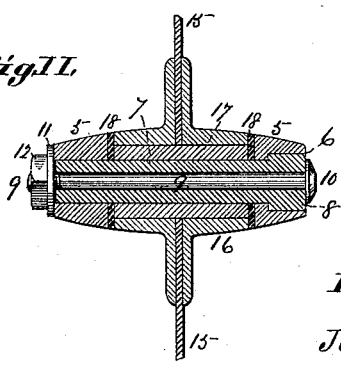
Attest:
Emma Arthur
Geo. E. Cruse
Inventor:
Joseph Cuthbertson.
By Knight Bros.
Attys.

UNITED STATES PATENT OFFICE.

JOSEPH CUTHBERTSON, OF BUNKER HILL, ILLINOIS, ASSIGNOR TO THE BOSS COULTER COMPANY, OF SAME PLACE.

ARBOR-BEARING.

SPECIFICATION forming part of Letters Patent No. 422,298, dated February 25, 1890.

Application filed July 13, 1888. Serial No. 279,797. (No model.)

*To all whom it may concern:*

Be it known that I, JOSEPH CUTHBERTSON, of Bunker Hill, in the county of Macoupin and State of Illinois, have invented a certain new and useful Improvement in Arbor-Bearings for Rolling Colters, &c., of which the following is a full, clear, and exact description, reference being had to the accompanying drawings forming part of this specification.

My invention consists in the combination, with a wooden arbor, of a metal screw-bolt which passes through the arbor from end to end.

Figure I is a side view of the colter, including the yoke, &c. Fig. II is an enlarged section at II II, Fig. I. Fig. III is a side view of the arbor with the nut and washer removed from the bolt. Fig. IV is a front view of the washer.

At 1 is seen a part of the plow-beam, to which the shank 2 of the colter may be attached in any preferred manner.

3 is the fork or yoke, which may be cast in one piece with the shank, or be made in a separate piece.

No novelty is claimed in the above parts.

The sides 4 of the yoke may end in bosses 5, as shown, the same being bored through transversely for the passage of the arbor on which the colter turns. The arbor has a tubular sleeve or wooden pin 7, with a non-cylindrical head 8, which fits in a cavity at 6 of one of the bosses 5.

9 is a metal bolt, which passes axially through the wooden sleeve or pin 7. The head 10 of the bolt is shown bearing against the head 8 of the sleeve and a washer 11 at the other end bearing against the other box 5, a nut 12 screwing upon the bolt bearing against the nut. The bolt is shown with a flat spot 13 at one side, and the washer with a flat place 14 at one side of the bore to fit the flat spot of the bolt, and thus prevent the rotation of the washer. (See Figs. I and IV.) The washer may, however, be dispensed with and the diameter of the nut 12 made sufficient to give proper bearing against the boss 5 outside the sleeve 7. The bolt 9 may be reversed, the head bearing against the boss in the position of the washer and the nut in the place of the head bearing against the head 8 of the sleeve. In this case the diameter of the head would properly be indicated by the washer.

15 is the colter-blade, and 16 the hub, the latter shown to consist of two parts riveted to the sides of the blade. 17 is a bushing inserted in the hub. 18 are washers, of leather or other suitable material, forming a packing between the bosses 5 and the ends of the hub to prevent the entrance of dust. The bushing and packing-disks are not essential, for they may be dispensed with without affecting the invention.

There are two requirements of the journal-bearing of a rolling colter, first, that the friction shall be light, and, second, that the colter shall not shake or wabble. The first of these is secured by the provision of a wooden arbor-bearing for the metal hub, and the second must be secured by giving the hub a steady bearing against the legs of the yoke. This latter is accomplished by means of the screw-bolt 9, for by turning the nut 12 inward the bosses or ends 5 of the yoke are drawn inward upon the hub, or upon washers bearing against its end.

By the combination of the wooden sleeve and metal core composed of a screw-bolt an arbor is constructed which is very cheap and leaves nothing to be desired for efficiency, and which may readily be taken out and replaced by a new one without the services of a mechanic.

I claim—

1. In combination with the bosses 5 of the yoke of a rotary colter, a tubular arbor 7, fixed in said yoke, a bolt 9, passing through said arbor and secured therein, colter-blade 15, and hub 16, consisting of two parts secured to the side of the blade, all substantially as and for the purpose set forth.

2. In combination with the bosses 5 of the yoke of a rotary colter, one of said bosses having a rectangular socket 6, a wooden sleeve 7, fitting in the sockets of the bosses and having a head 8 fitting in socket 6, bolt 9, passing through this said sleeve and secured by a nut, colter-blade 15, hub 16, consisting of two parts riveted to the sides of the blade, bushing 17, inserted in the hub and bearing on the sleeve 7, and washers 18 at each end of the bushing, substantially as shown and described.

JOSEPH CUTHBERTSON.

In presence of—
J. H. BELT, Jr.,
MARCUS SESSEL.